Aug. 6, 1929.  R. D. DELAMERE ET AL  1,723,680
INDIVIDUALLY POWER DRIVEN SHAFT UNIT
Filed July 5, 1927
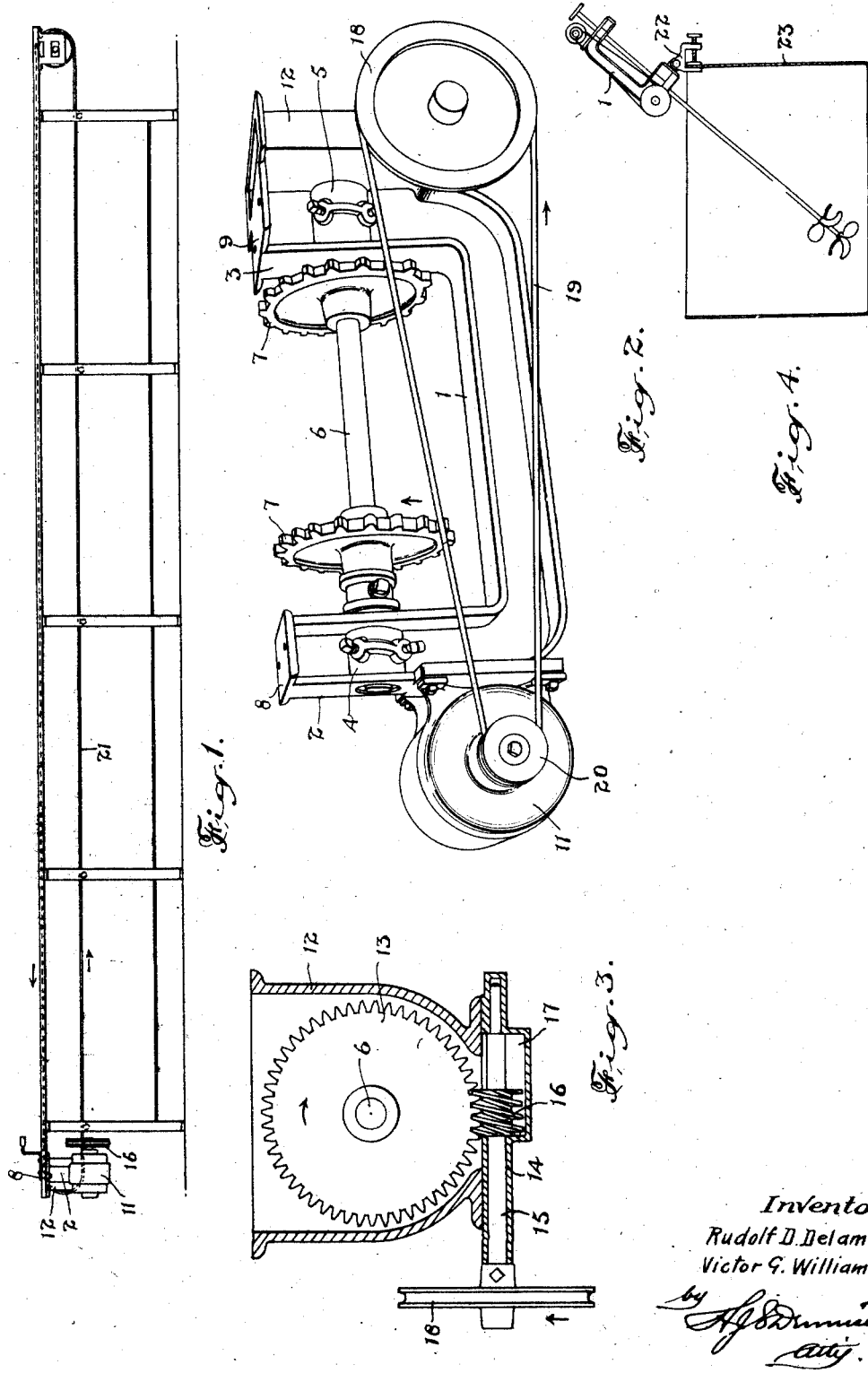
Inventors.
Rudolf D. Delamere
Victor G. Williams Patented Aug. 6, 1929.

1,723,680

UNITED STATES PATENT OFFICE.

RUDOLF D. DELAMERE AND VICTOR G. WILLIAMS, OF TORONTO, ONTARIO, CANADA.

INDIVIDUALLY POWER-DRIVEN SHAFT UNIT.

Application filed July 5, 1927. Serial No. 203,546.

The principal objects of the invention are, to simplify the construction of driving units for belt conveyors, reducing the cost of manufacture and of installation, and further to devise an individual power driven shaft unit which will be very rigid and will be remarkably free from vibration and which is adapted for various uses.

The principal features of the invention consist in the novel construction of a rigid cast metal frame to carry a pair of spaced journals adapted to support an individual drive shaft, said frame also carrying the shaft operating motor and reduction gear in a rigid unit.

In the drawings, Figure 1 is a longitudinal elevational view of a conveyor table having our improved drive unit arranged thereon for driving the conveyor belt.

Figure 2 is a perspective view of our improved unit constructed for driving a chain or link belt.

Figure 3 is an enlarged sectional detail taken through the reduction gear.

Figure 4 is an elevational view showing the application of our unit to an agitator.

In the manufacture of conveyor belt installations it has been the practice to construct supporting table frames and to attach the various belt driving elements to different parts of the frame structure.

Such arrangements are cumbersome and require a considerable skill in adjustment in their erection and installation.

This invention renders the installation of conveyor belts very simple and accurate by reason of the driving elements being contained in a single unitary structure.

The invention comprises a rigid U-shaped frame 1 which is preferably formed of a flanged cast metal construction of I-shape or channel-shaped section.

The legs 2 and 3 of the frame are each formed with horizontal bosses 4 and 5 in which are arranged suitable anti-friction bearings to support the ends of the shaft 6 upon which are shown the sprocket wheels 7 for driving a sprocket or link belt.

The upper ends of the legs 2 and 3 are provided with flat bearing plates 8 and 9 to be secured to the surface of the table or other structure on which the carrier belt is to be operated.

The lower portion of the leg 2 is formed with an enlarged portion which forms a base plate for the electric motor 11 which drives the unit.

A casing 12, preferably cast as a unitary part with the leg 3 of the frame, forms a housing for the worm wheel 13 which is secured on the shaft 6 extending into the casing. A housing 14, formed of bronze or a suitable anti-friction metal is secured to the bottom of the casing 12 and carries a worm shaft 15, the worm 16 of which meshes with the wheel 13. The worm operates in a pocket 17 which retains a quantity of lubricant and ensures the smooth and easy operation of the reduction gear.

A pulley 18 is mounted upon the outer end of the shaft 15 and is driven by a belt 19 which extends lengthwise of the frame and passes around a pulley 20 secured to the shaft of the motor 11.

The lower reach of the belt 19 is arranged below the top side of the bottom reach of the frame 1 and the upper reach of the belt 19 extends parallel with the shaft 6 between the top and bottom of the sprockets 7 so that the belt conveyor, passing around the sprockets, or a substituted drum, will pass over and under the upper reach of the motor driven belt.

The electric motor through the belt 19 drives the shaft 15, and the reduction gear, constituting the worm and worm wheel, drives the shaft 6 to operate the conveyor belt 21.

A driving unit such as described will be shop assembled at the least possible expense and it may be very quickly installed on a conveyor table frame.

The unit structure described may be advantageously applied to the operation of agitators as illustrated in Figure 4 as it is adapted to operate at any desirable angle. In the form of structure illustrated in Figure 4 the frame 1 is provided with a clamp hinge support 22 which holds the frame upon the container 23 and the agitator shaft may be raised or lowered quite readily.

What we claim as our invention is:

1. An individually power driven shaft unit, comprising a cast metal frame having a pair of rigid spaced legs, aligned journal bearings arranged in said legs, a shaft journalled in said bearings and extending between said legs, a motor mounted on one of the legs of said frame, speed reduction means mounted on the other leg and operatively connected with said shaft, and means extending between said frame legs operatively connecting said motor with said speed reduction means.

2. An individually power driven shaft unit, comprising a U-shaped cast metal frame having aligned journal bearings in the legs thereof intermediate of their height, a shaft journalled in said bearings and extending between said legs, a reduction gear operatively connected with said shaft and housed in one leg of said frame, and having a shaft extending transversely of the former shaft, a pulley mounted on said latter shaft, a motor rigidly mounted on the other leg of said frame with its axis arranged transversely of and offset from said first mentioned shaft, a pulley on said motor shaft, and a belt connecting said pulleys.

3. An individually power driven shaft unit, comprising a U-shaped frame of flanged cross section having horizontal journal bearings arranged intermediate of the height of the legs, a housing formed in one of said legs, a shaft journalled in said bearings and extending into said housing, a worm wheel mounted on said shaft within said housing, a journal housing secured at the bottom of the aforesaid housing, a worm shaft journalled in said latter housing and having its worm meshing with said worm wheel, and an electric motor rigidly mounted on said frame and operatively connected with said worm shaft.

4. An individually power driven shaft unit, comprising a U-shaped cast metal frame having flanged ends on said legs and a face plate flanged on the side of one of said legs, horizontally arranged journal bearings in said legs intermediate of their height, a conveyor belt shaft mounted in said bearings, a reduction gear operatively connected with one end of said shaft and mounted on the frame, an electric motor rigidly secured on the face plate formed on said frame, and a belt extending from said electric motor to said reduction gear and having one reach extending between the upper and lower planes of the conveyor belt and the other reach extending below the lower plane of the conveyor belt.

RUDOLF D. DELAMERE.
VICTOR G. WILLIAMS.